(12) United States Patent
Black (10) Patent No.: US 8,754,856 B2
(45) Date of Patent: Jun. 17, 2014

(54) MULTI-TOUCH SURFACE INTERACTION

(75) Inventor: Jonathan S. Black, Dundee (GB)

(73) Assignee: NCR Corporation, Duluth, GA (US)

( * ) Notice: Subject to any disclaimer, the term of this patent is extended or adjusted under 35 U.S.C. 154(b) by 564 days.

(21) Appl. No.: 12/570,405

(22) Filed: Sep. 30, 2009

(65) Prior Publication Data

US 2011/0074703 A1    Mar. 31, 2011

(51) Int. Cl.
*G06F 3/048* (2013.01)

(52) U.S. Cl.
USPC ............................................ 345/173; 715/863

(58) Field of Classification Search
USPC .................................... 345/173; 715/863, 864
See application file for complete search history.

(56) References Cited

U.S. PATENT DOCUMENTS

| | | | |
|---|---|---|---|
| 2008/0168403 A1* | 7/2008 | Westerman et al. | 715/863 |
| 2010/0050133 A1* | 2/2010 | Nishihara et al. | 715/863 |
| 2010/0302155 A1* | 12/2010 | Sands et al. | 345/163 |
| 2011/0041098 A1* | 2/2011 | Kajiya et al. | 715/849 |

OTHER PUBLICATIONS

Wu et al., "Multi-Finger and Whole Hand Gestural Interaction Techniques for Muti-User Tabletop Displays" Proc. Symp. on User Interface Software and Technology, 2003 pp. 193-202.*

* cited by examiner

*Primary Examiner* — Latanya Bibbins
(74) *Attorney, Agent, or Firm* — Joseph P. Mehrle (57) ABSTRACT

A computing device including a multi-touch surface, and a method of operation thereof are described. The method comprises: detecting a customer's hand placed palm downwards on the multi-touch surface and detecting the customer's hand pivoting upwards from the detected palm downwards position so that an edge of the hand is placed on the multi-touch surface. The method also comprises displaying a private interaction window located adjacent to, and on the palm side of, the customer's hand; and communicating private data on the private interaction window. The private interaction window is dimensioned to be shielded by the customer's hand.

6 Claims, 5 Drawing Sheets

MULTI-TOUCH SURFACE INTERACTION

FIELD OF INVENTION

The present invention relates to a method and apparatus for multi-touch surface interaction.

BACKGROUND OF INVENTION

A multi-touch surface computing device (hereinafter a "multi-touch device") has been developed by Microsoft Corporation (trade mark) and is available as an interactive table. This interactive table can image objects placed thereon and support interactions via its extended surface from multiple users simultaneously.

This multi-touch device has applicability to various business applications, but because it can be used by multiple customers simultaneously, it is possible that private information (such as account balance information) could be viewed by people other than the intended recipient. Therefore, additional security is required for use in financial applications or other applications presenting personal or private data.

SUMMARY OF INVENTION

Accordingly, the invention generally provides methods, systems, apparatus, and software for a multi-touch surface computing device transferring personal data.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects of the invention may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of operating a computing device including a multi-touch surface, the method comprising: detecting a customer's hand placed palm downwards on the multi-touch surface; detecting the customer's hand pivoting upwards from the detected palm downwards position so that an edge of the hand is placed on the multi-touch surface; displaying a private interaction window located adjacent to, and on the palm side of, the customer's hand, the window being dimensioned to be shielded by the customer's hand; and communicating private data on the private interaction window.

The private data may comprise data to be viewed by the customer (for example, a balance of a customer's bank account or playing cards dealt to a gaming participant), and/or data to be entered by a customer (for example, a keypad that the customer will use to enter a private code).

The step of displaying a private interaction window may include the sub-step of dimensioning the private interaction window based on a size of the customer's hand measured during the step of detecting a customer's hand placed palm downwards.

The step of displaying a private interaction window may include the sub-step of dimensioning the private interaction window based on an angle between the customer's smallest finger and the edge of the customer's hand. Preferably, the smaller the angle between the customer's smallest finger and the edge of the customer's hand, the smaller the private interaction window displayed by the computing device.

Alternatively, the step of displaying a private interaction window may include the sub-step of dimensioning the private interaction window based on the distance (or change in distance) between the edge of the customer's palm and the tip of the customer's finger.

The method may include the further step of allowing the customer to enlarge the private interaction window up to a predetermined maximum size. The predetermined maximum size may be computed based on the size of the customer's hand.

The method may include the further step of removing the private interaction window in response to detecting the customer's hand being lifted off the multi-touch surface.

The step of removing the private interaction window in response to detecting the customer's hand being lifted off the multi-touch surface may include the sub-step of ascertaining if the customer's hand is replaced in substantially the same place within a predetermined time (preferably, a relatively short time, for example, of the order of tens of milliseconds) before removing the private interaction window to ensure that the customer has not momentarily lifted his/her hand by a small amount.

Alternatively, the step of removing the private interaction window in response to detecting the customer's hand being lifted off the multi-touch surface may include the sub-step of ascertaining if the customer's hand is replaced in substantially the same place within a predetermined time (preferably, a relatively short time, for example, of the order of tens of milliseconds) after removing the private interaction window, and re-displaying the private interaction window at the same location as previously. This may include the sub-step of maintaining the state of an application after re-displaying the private interaction window, or reverting to a previous state of the application after re-displaying the private interaction window.

The method may include the step of validating that the customer's hand is placed on the multi-touch surface in a manner consistent with previous interactions by that customer during the same transaction.

The manner consistent with previous interactions may comprise the customer placing his/her hand in a zone previously touched by the customer in the same transaction or interaction. Alternatively, or additionally, the manner consistent with previous interactions may comprise the customer's hand movement being consistent with the customer standing on a side of the computing device previously used during the same transaction.

The step of communicating private data on the private interaction window may comprise receiving private data input by the customer, and/or displaying private data to the customer.

The private data may relate to a financial application, a gaming application (such as used in a casino), a medical application, a government application, an entertainment application, or the like.

By virtue of this aspect, a customer is able to invoke a private window during a transaction using an intuitive gesture, so that the customer is able to receive or enter private data without other people being able to observe the private data being viewed or entered by the customer.

According to a second aspect there is provided apparatus for viewing personal information using a multi-touch surface, the apparatus comprising: a multi-touch surface; and a computer in communication with the multi-touch surface, the computer being operable to: (i) detect a customer's hand placed palm downwards on the multi-touch surface; (ii) detect the customer's hand pivoting upwards from the detected palm downwards position so that an edge of the hand is placed on the multi-touch surface; (iii) display a private interaction window located adjacent to, and on the palm side of, the customer's hand, the window being dimensioned to be shielded by the customer's hand; and (iv) communicate private data on the private interaction window.

According to a third aspect there is provided a network of multi-touch surface computing devices installed within a branch, each multi-surface computing device being operable to implement the method of the first aspect.

According to a fourth aspect there is provided a computer program comprising program instructions operable to implement all of the steps of the method of the first aspect.

The computer program may be embodied on a record medium or conveyed on an electrical carrier signal.

The record medium may comprise a computer memory, magnetic or optical drives, or the like.

These and other aspects will be apparent from the following specific description, given by way of example, with reference to the accompanying drawings.

DETAILED DESCRIPTION

Figure 1:
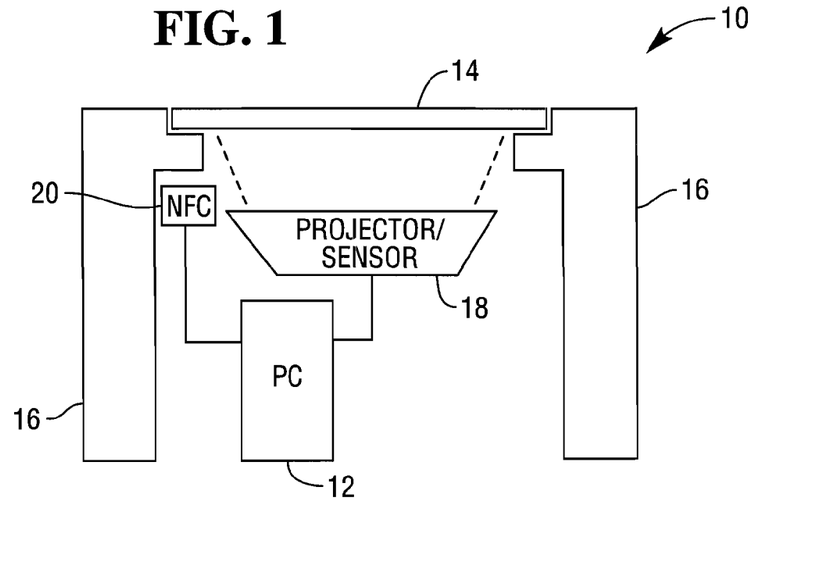
FIG. 1 is a simplified pictorial diagram of a multi-touch surface computing device in accordance with an embodiment of the present invention.

Reference is first made to FIG. 1, which is a simplified pictorial diagram of a multi-touch surface computing device (hereinafter a "multi-touch device") 10 located in a bank branch in accordance with an embodiment of the present invention.

The multi-touch device 10 comprises a computer 12; a translucent surface 14 mounted horizontally as an inset on a table 16; a combined projector/position sensor unit 18, and a near-field communications (NFC) wireless transceiver 20 coupled to the computer 12.

The translucent surface 14 and combined projector/position sensor unit 18 are available from Microsoft Corporation, Redmond, Wash., and are similar to those described in US patent application number 2007/0188444 (assigned to Microsoft Corporation).

The NFC transceiver 20 is an ACR122 NFC contactless smart card reader available from Advanced Card System Limited (trade mark), Units 2010-2013, 20th Floor, Chevalier Commercial Centre, 8 Wang Hoi Road, Kowloon Bay, Hong Kong, although any other convenient NFC transceiver (or other short range RF transceiver) would be satisfactory. The NFC transceiver 20 couples to a conventional USB port within the computer 12.

Figure 2:
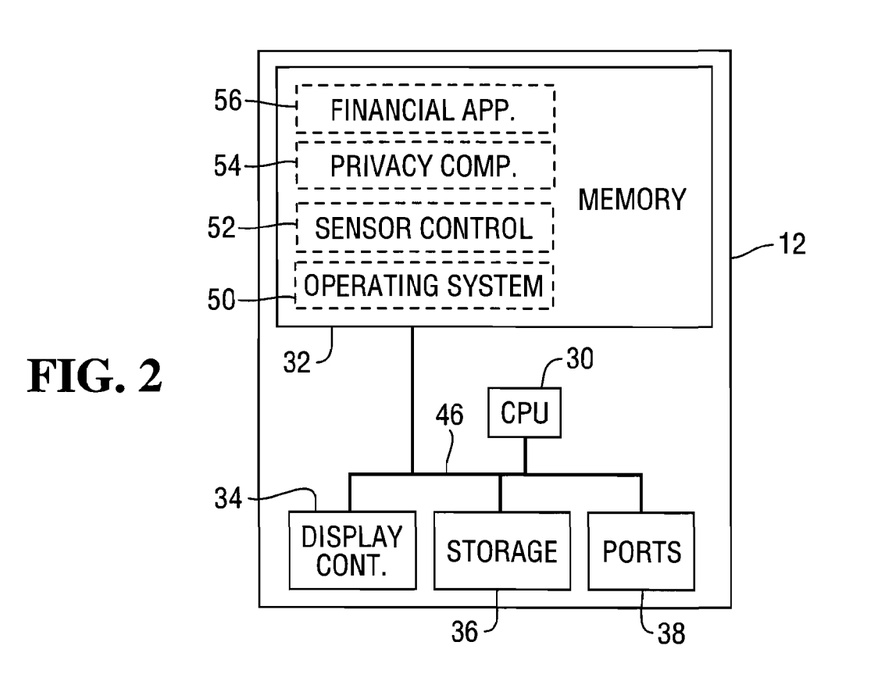
FIG. 2 is a simplified schematic diagram of a part (the computer) of the multi-touch surface computing device of FIG. 1, illustrating components thereof in more detail, in particular, a software component (the privacy component) for detecting a customer's privacy gesture.

The computer 12 is a standard personal computer, as shown schematically in FIG. 2, with additional software components loaded therein.

The computer 12 comprises one or more processors 30 coupled to a memory 32, a display adapter (in the form of a graphics card) 34, a storage device (in the form of a magnetic disk drive) 36, and serial ports 38 supporting universal serial bus (USB) connections.

The memory 34 includes a standard operating system kernel 50, a sensor control application 52 (provided by the vendor of the translucent surface 14 and combined projector/position sensor unit 18), a privacy detection component 54 which augments the control application 52, and a financial application 56 for enabling customers to perform various financial transactions (account balance, payments to other accounts, loans, mortgages, and the like).

In this embodiment, the sensor control application 52 is provided by Microsoft Corporation and is used for (i) imaging objects in proximity to (which includes contact with) the translucent surface 14, and (ii) providing the operating system kernel 50 and privacy detection component 54 with co-ordinates of a point or points on the translucent surface 14 touched by a user (the customer or a member of staff).

The privacy component 54 is responsible for (i) detecting a customer gesture indicative of a privacy request; (ii) ascertaining details of the privacy gesture; and (iii) communicating the privacy request and any ascertained details to any application registered with the privacy component 54 (for example, the financial application 56). This will be described in more detail below.

Figure 3:
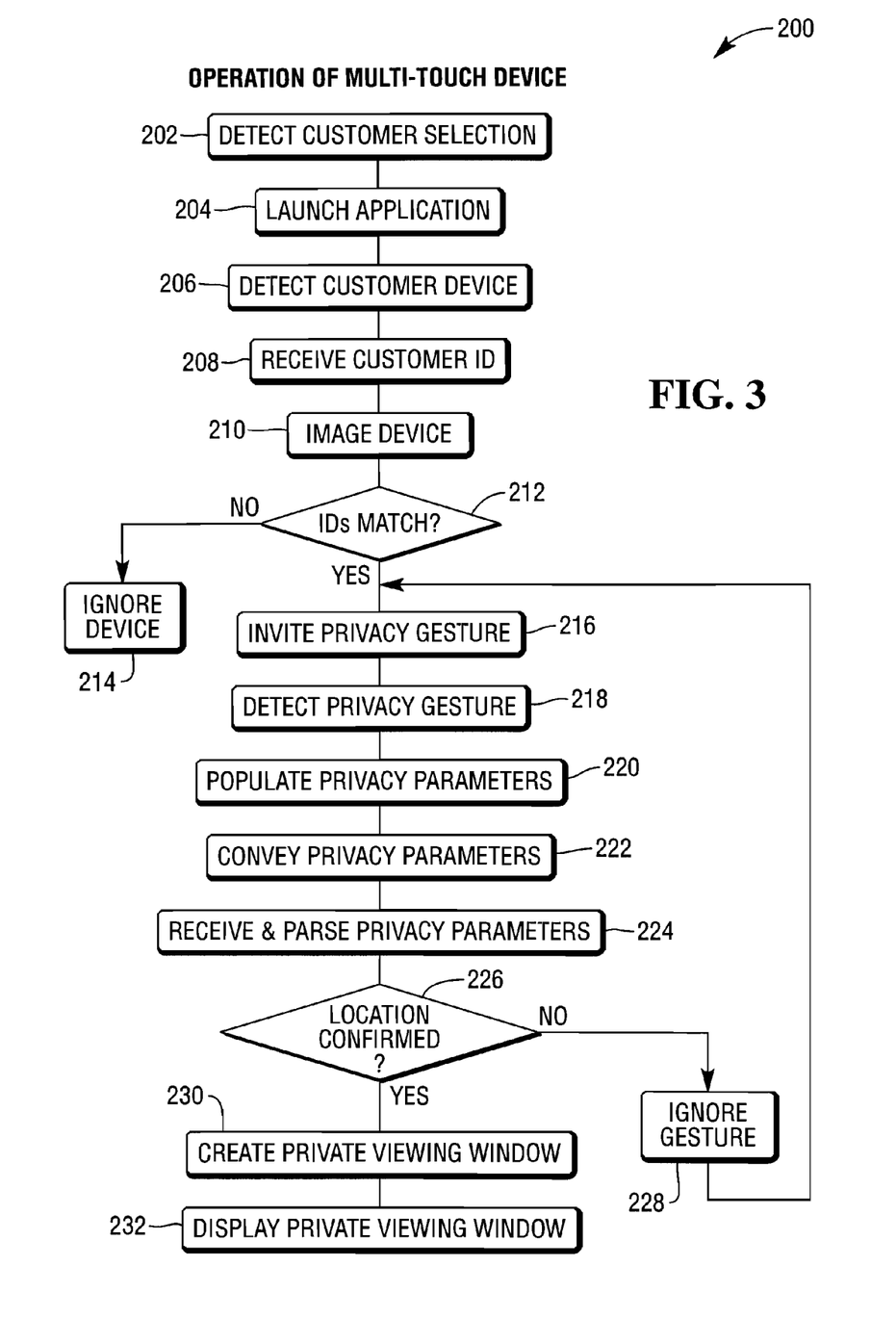
FIG. 3 is a flowchart illustrating steps involved in a customer conducting a transaction at the multi-touch surface computing device of FIG. 1 using another software component (the financial application) that responds to an event received from the privacy component.

Reference will now be made to FIG. 3, which is a flowchart 200 illustrating steps involved in a customer conducting a transaction at the multi-touch device 10; and also to FIGS. 4 to 8 which are pictorial plan diagrams of the multi-touch device 10 at different stages of a financial transaction.

Figure 4:
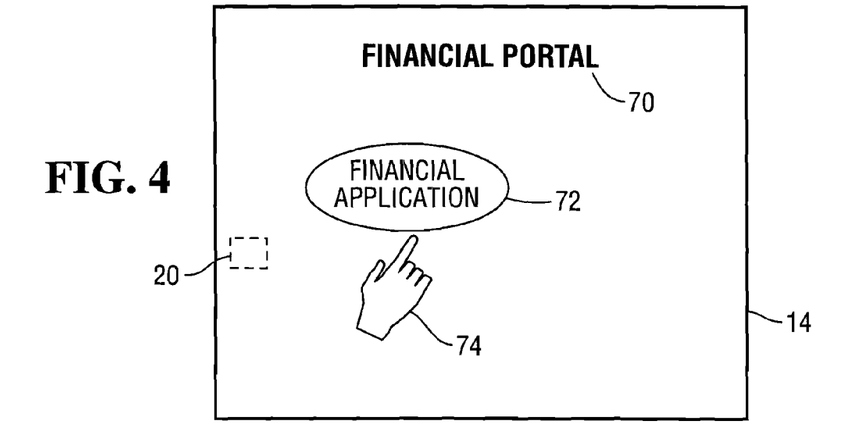
FIG. 4 is a pictorial plan diagram of the multi-touch surface computing device of FIG. 1 at a first stage (launching a financial application) of the transaction illustrated in the flowchart of FIG. 3.

As illustrated in FIG. 4, the multi-touch device 10 initially displays on the translucent surface 14 a banner 70 (populated with the text "Financial Portal" in this example) and one or more application icons (financial application icon 72 is shown in FIG. 4) for selection by a finger on a customer's hand 74.

The customer approaches the multi-touch device 10 and selects the financial application icon 72, which the computer 12 detects (step 202).

The computer 12 then processes this selection by launching the financial application 56 associated with the financial application icon 74 (step 204). This involves (i) presenting a new text on the banner 70 (via the display adapter 34 and the combined projector/position sensor unit 18), which informs the customer that the current process is a financial application, and (ii) presenting a transaction window 76. At this stage, the transaction window 76 is populated with text inviting the customer to provide suitable identification.

Figure 5:
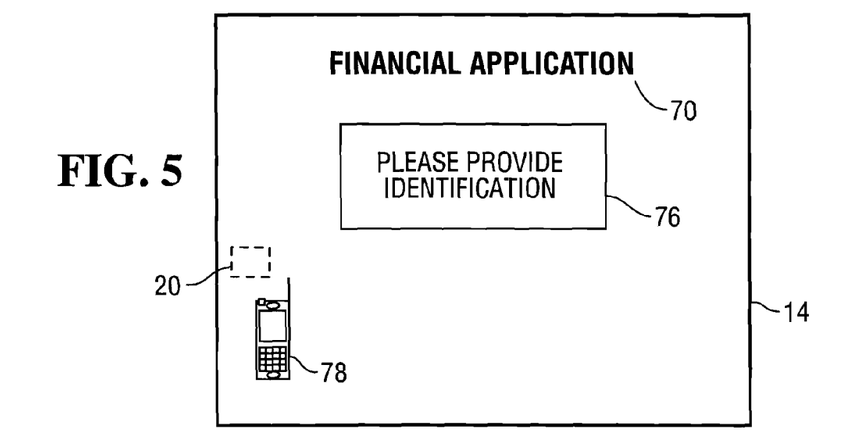
FIG. 5 is a pictorial plan diagram of the multi-touch surface computing device of FIG. 1 at a second stage (a customer identification stage prior to entry of private information) of the transaction illustrated in the flowchart of FIG. 3.

In this example, the customer places a cellular radiofrequency telephone 78 (hereinafter a mobile phone) including an NFC wireless transceiver (not shown) on the translucent surface 14 (as illustrated in FIG. 5). Placing of the mobile phone 78 on the translucent surface 14 is detected by the sensor control application 52 (step 206).

The computer 12 also receives an identification signal from the mobile phone's wireless transceiver (via the NFC transceiver 20) and conveys this to the financial application 56 (step 208). The computer 12 implements a validation routine. This involves imaging a visual identification (such as a barcode) on the mobile phone 78 (step 210) and comparing this visual identification with the identification signal from the mobile phone's wireless transceiver (step 212).

If the two identifications do not match, then the mobile phone 78 is ignored by the computer 12 (step 214). If they do match, then the transaction proceeds to the next step.

The financial application 56 then requests the customer to prepare to enter a personal identification number (PIN) (step 216). In this example, this is implemented by populating the transaction window 76 with text stating "Please Provide Identification"), as illustrated in FIG. 5.

Figure 6:
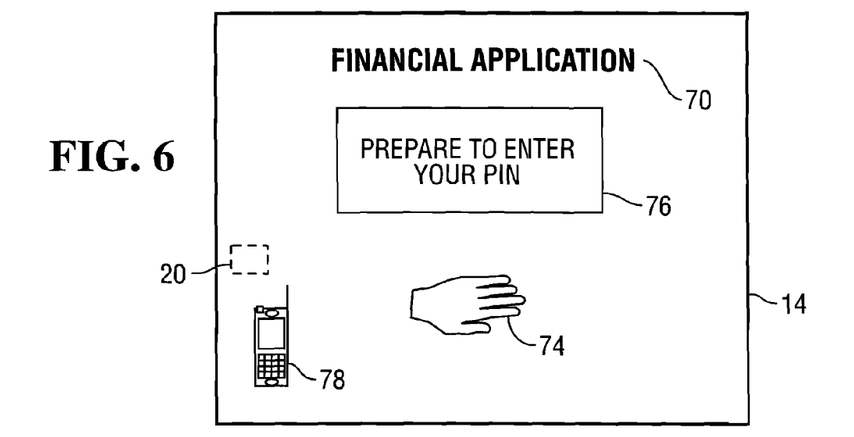
FIG. 6 is a pictorial plan diagram of the multi-touch surface computing device of FIG. 1 at a third stage (a first part of a privacy gesture request) of the transaction illustrated in the flowchart of FIG. 3.
Figure 7:
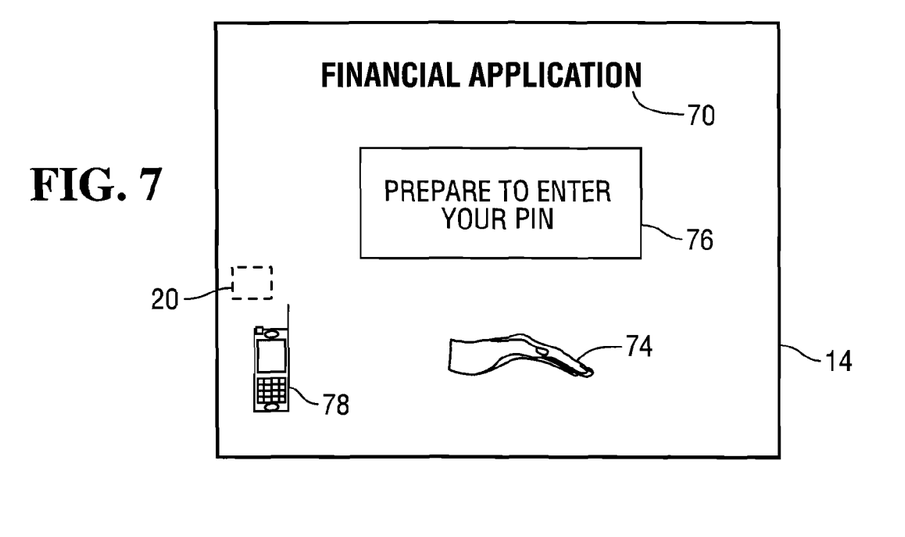
FIG. 7 is a pictorial plan diagram of the multi-touch surface computing device of FIG. 1 at a fourth stage (a second part of a privacy gesture request) of the transaction illustrated in the flowchart of FIG. 3.

To enter his/her PIN, the customer must first perform a privacy gesture on the translucent surface 14. This is implemented by a two-stage process. The first stage, illustrated in FIG. 6, is for the customer to place his/her hand 74 palm downwards on the translucent surface 14. The second stage is for the customer to pivot his/her hand 74 upwards from the palm-downwards position so that an edge of the hand (the edge opposite the thumb and which is formed in part by the little finger) is placed on the translucent surface 14 (illustrated in FIG. 7). This is detected by the sensor control application 52 (step 218) as illustrated in FIGS. 9 and 10, respectively, and conveyed to the privacy detection component 54.

Figure 9:
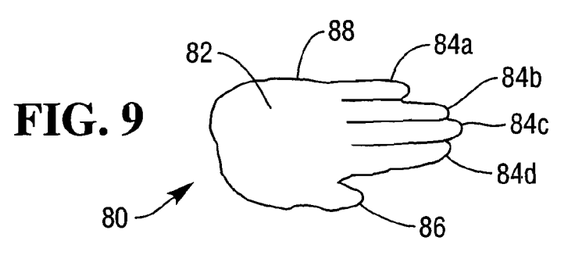
FIG. 9 is a pictorial plan view of an image of a customer's hand in a palm-downwards position as sensed by the privacy component of FIG. 2.

FIG. 9 illustrates an image 80 detected by the sensor control application 52 when the customer's hand 74 is palm-downwards on the translucent surface 14. The image 80 shows the customer's palm 82, four fingers 84a to 84d, thumb 86, and hand edge 88. The privacy detection component 54 analysis this image and ascertains if it represents a customer's hand palm-downwards on the translucent surface 14.

Figure 10:
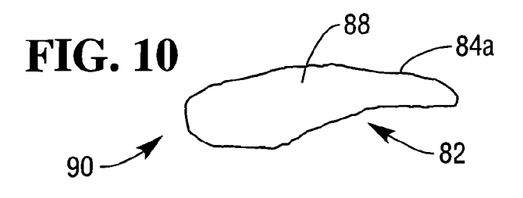
FIG. 10 is a pictorial plan view of an image of a customer's hand in an edge-on position with fingers uncurled, as sensed by the privacy component of FIG. 2.

FIG. 10 illustrates an image 90 detected by the sensor control application 52 when the customer's hand 74 is pivoted from the palm-downwards position to the upright position. The image 90 shows the customer's hand edge 88 extending from the palm 82 to the little finger 84a, with all of the fingers 84 in a straight line (not curled). Again, the privacy detection component 54 analysis this image and ascertains if it represents a customer's hand resting on its edge on the translucent surface 14.

Figure 11:
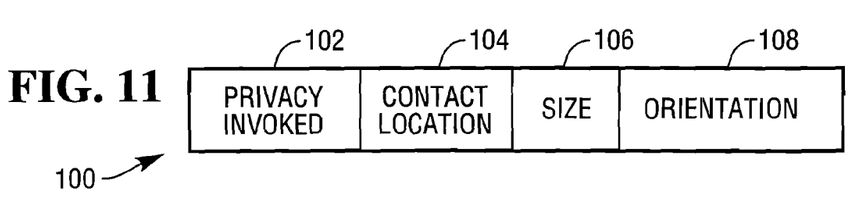
FIG. 11 is a schematic diagram illustrating privacy parameters generated by the privacy component of FIG. 2.

In response to detecting a customer's privacy gesture, the privacy detection component 54 creates a privacy request for conveying to the financial application 56 (step 220). This privacy request comprises a plurality of privacy parameters, as illustrated in FIG. 11, which are populated by the privacy detection component 54.

The privacy parameters 100 comprise: a privacy field 102, indicating that a privacy gesture has been detected; a contact location field 104, indicating the location on the translucent surface 14 at which the privacy gesture was detected; a size field 106, indicating a recommended size for a privacy window; and an orientation field 108, indicating an orientation of the customer's hand when the privacy gesture was requested.

The privacy field 102 is a single bit field indicating that privacy is either invoked or cancelled. A privacy request is invoked using the two-stage process described above. A privacy request may be cancelled in different ways. For example, a privacy request may be cancelled (i) by the customer returning his/her hand to a palm-downwards position on the translucent surface 14, or (ii) by the customer removing his/her hand from the translucent surface 14.

The contact location field 104 comprises a unique identifier indicating the location on the translucent surface 14 at which the privacy gesture was detected. This location identification is provided automatically by the operating system 50 of the multi-touch device 10. This enables the financial application 56 to confirm that the privacy gesture was performed at a location in the vicinity of the last interaction performed by the customer (for example, placing the mobile phone 78 on the translucent surface 14).

Figure 12:
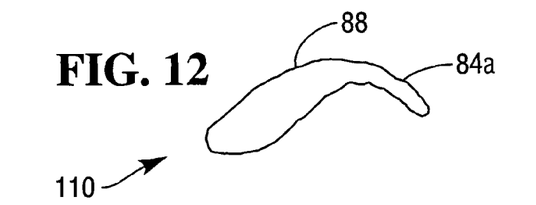
FIG. 12 is a pictorial plan view of an image of a customer's hand in an edge-on position with fingers curled, as sensed by the privacy component of FIG. 2.

The size field 106 may be computed based on the detected dimensions of the customer's hand (as computed by the privacy detection component 54). This computation may be influenced by the degree of curl of the customer's fingers when the privacy gesture was performed. For example, in FIG. 10 the customer's fingers are not curled; whereas, in FIG. 12, an image 110 illustrates the customer's fingers 84 (which are part of the hand edge 88) being tightly curled, indicating a greater degree of privacy is desired by the customer.

The orientation field 108 indicates an orientation of the customer's hand 74 when the privacy gesture was requested. Any convenient orientation system may be used, but in this example, the orientation is one angle out of eight possible angles (0, 45, 90, 135, 180, 225, 270, or 315 degrees) relative to a preselected side of the translucent surface 14. Measuring the exact angle is not essential, as this orientation is primarily used to ensure that the customer is located at the same side of the multi-touch device 10 as expected by the computer 12, based on previous interactions by the customer during this transaction. This is another means for checking that a different customer is not trying (either innocently or fraudulently) to invoke a privacy window for another customer's transaction.

Once the privacy detection component 54 has populated the fields comprising the privacy parameters 100 (step 220), it then conveys these populated privacy parameters 100 to the financial application 56 (step 222).

The financial application 56 receives and parses these privacy parameters 100 (step 224).

The financial application 56 then confirms that the privacy gesture was received at a location and orientation consistent with where the customer is expected to be located, based on the previous interaction with the customer (step 226). This involves comparing the location of the last touch by the customer with the contents of the contact location field 104; and comparing contents of the orientation field 108 with an expected orientation based on the last position of the customer's hand.

If the privacy gesture was not received at a location and orientation consistent with where the customer is expected to be located, then the financial application 56 ignores the privacy gesture (step 228) and returns to step 216.

Figure 8:
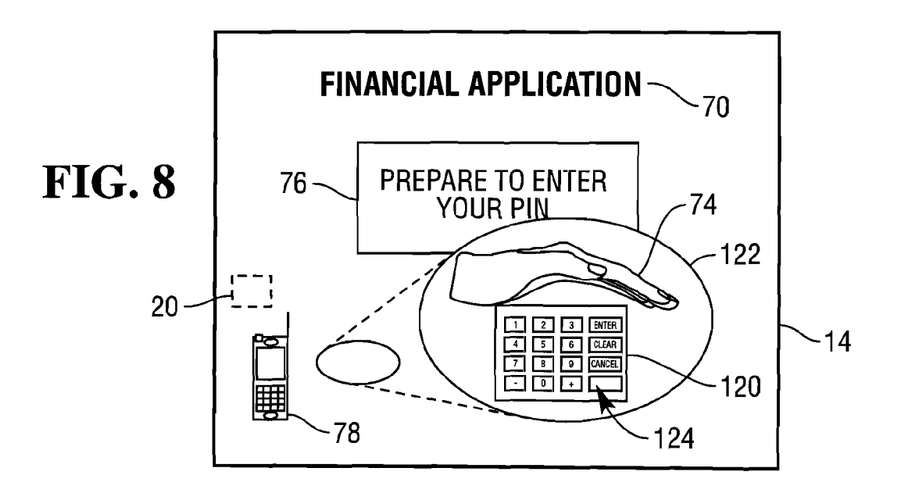
FIG. 8 is a pictorial plan diagram of the multi-touch surface computing device of FIG. 1 at a fifth stage (during entry of private information) of the transaction illustrated in the flowchart of FIG. 3.

If the privacy gesture was received at a location and orientation consistent with where the customer is expected to be located, then the financial application 56 creates a private interaction window 120 (step 230) dimensioned to be shielded by the customer's hand 74, and displays this private interaction window 120 on the translucent surface 14 (step 232), as illustrated in FIG. 8.

FIG. 8 illustrates the customer's hand 74 and the private interaction window 120 in an enlarged form, as shown by ellipse 122, for clarity. The dimensions of the private interaction window 120 are influenced by the size field 106 from the privacy parameters 100.

The financial application 56 populates the private interaction window 120 with a PINpad 124 (FIG. 8). The PINpad 124 has numerals "0" to "9", "cancel", "enter", and "delete" displayed. As illustrated in FIG. 8, this private interaction window 120 is displayed adjacent to, and on the palm side of, the customer's hand 74.

The customer can then enter his/her PIN, while shielding the selections he/she makes by keeping his/her hand resting edge-on on the translucent surface 14. When the customer has completed entering his/her PIN, the financial application 56 detects that PIN entry has been completed and removes the private interaction window 120 and its contents from the translucent surface 14 (that is, it ceases to display the private interaction window 120 and the PINpad 124).

The financial transaction can then continue as for a traditional financial application.

Figure 13:
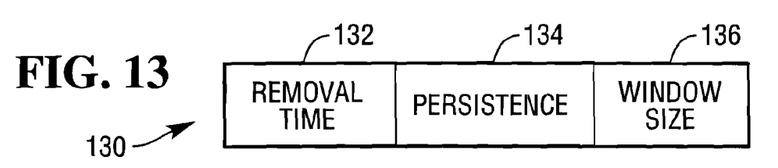
FIG. 13 is a schematic diagram illustrating control parameters stored in the financial application of FIG. 2.

Reference will now also be made to FIG. 13, which is a schematic diagram illustrating pre-stored control parameters 130 in the financial application 56.

These pre-stored control parameters 130 control the private interaction window 120. In particular, some of these parameters instruct the financial application 56 about what action to take in the event that the customer inadvertently or intentionally removes his/her hand during entry of data at a private interaction window 120. These pre-stored parameters include: a removal time parameter 132, a persistence parameter 134, a base window size parameter 136, and a window properties parameter 138.

The removal time parameter 132 indicates to the financial application 56 how much time can elapse between an edge of the customer's hand 74 being lifted off the translucent surface 14 and then replaced on the translucent surface 14 without the financial application 56 closing the session with the customer.

If the privacy detection component 54 detects that the customer has lifted his/her hand 74 prior to completion of a data entry task at a private interaction window 120, then the financial application 56 will wait for the time specified by the removal time parameter 132 before terminating the current session.

The persistence parameter 134 is related to the removal time parameter 132, and is only relevant where (i) the financial application 56 is currently displaying a private interaction window 120, and (ii) there is a temporary removal of the customer's hand 74 that is shorter than the removal time parameter 132. In such a case, the persistence parameter 134 indicates to the financial application 56 what action to take.

If persistence is set to "Full" (indicated by a first code stored in the persistence field 134), then the financial application 56 will allow the customer to continue entering data from where he/she left off entering data, without having to re-enter data previously entered immediately prior to temporarily removing his/her hand.

If persistence is set to "Partial" (indicated by a second code, different from the first code), then the financial application 56 will allow the customer to enter data at the same screen (or window) that was displayed prior to temporarily removing his/her hand, but any data entered on that screen prior to the temporary removal has to be re-entered by the customer. This may be used to ensure secure data entry is not compromised, for example, by a third party only having to enter the final digit of a passcode.

If persistence is set to "None" (indicated by a third code, different from each of the first and second codes), then the financial application 56 will revert to a point in the transaction before the screen that was displayed when the customer temporarily removed his/her hand.

Thus, the code stored in the persistence field 134 indicates to the financial application 56 how it is to deal with a temporary removal of a customer's hand 74 when a private interaction window 120 is being displayed.

The base window size parameter 136 indicates to the financial application 56 what default dimensions a private interaction window 120 should have. However, this value can be adjusted by the financial application 56 based on the contents of the size field 106.

The window properties parameter 138 indicates various other properties of the private interaction window, such as, whether the window is locked in size and/or position. For example, the window properties parameter 138 may indicate that the window size can be adjusted by the customer during use; alternatively, it may indicate that the window size is fixed. Similarly, the window properties parameter 138 may indicate that the window can be moved to a different part of the translucent surface 14 by the customer; alternatively, it may indicate that the window location is fixed. The window properties parameter 138 may also indicate a maximum time during which the private interaction window will be displayed during a transaction.

Various modifications may be made to the above described embodiment within the scope of the invention, for example, in other embodiments various changes may be made to the process. For example, the application may display a private interaction window (but not populated with any private data) during a transaction, but re-locate the private interaction window in response to a customer performing a privacy gesture.

In other embodiments additional peripherals may be coupled to the computer 12. For example, a card reader may be coupled to allow a customer or an authorized user to insert a card containing additional data, transaction options, or the like. As another example, an encrypting keypad may be coupled to the computer 12 to allow secure entry of data, such as a PIN (personal identification number).

In other embodiments, a multi-touch device may be based on other technologies, for example, those available from Perceptive Pixel, Inc. (trade mark), 111 Eighth Avenue, 16th Floor, New York, N.Y. 10011.

In other embodiments, a communications facility other than NFC, for example 802.11b or Bluetooth (trade mark), may be provided. Alternatively, the communications facility may be a wired rather than wireless communication facility, such as USB or RS232.

In other embodiments, the multi-touch device 10 may not include any communications facility.

In other embodiments, an interactive computing device in a form other than a table may be provided. For example, the interactive computing device may be a multi-touch surface mounted vertically in a similar way to a chalk board.

In other embodiments, the multi-touch surface may be transparent or opaque. Technologies other than projection may be used to render text and images on the multi-touch surface.

In other embodiments, an application other than a financial application may be provided. For example, the multi-touch device 10 may execute one or more of: a government application (for registering with a public authority for a driver license, a birth, a marriage, or the like), a gaming application (for gambling or playing other types of games), a healthcare application, or the like.

In other embodiments, different transactions may be implemented. For example, a cash withdrawal transaction may be pre-staged, checks to be deposited may be imaged, or the like.

In other embodiments, the graphical layout displayed on the translucent surface 14 by the application may be different to that described. For example, not banner may be provided, and the transaction window may be different from that described.

In other embodiments, a token other than a mobile phone may be used to claim an identity, for example, an integrated circuit card, a magnetic stripe card, or the like.

In other embodiments, a privacy request may be cancelled by the customer returning his/her hand to a palm-downwards position on the translucent surface covering the private interaction window with his/her hand.

In other embodiments, the application may not validate that the customer's hand was placed in a location consistent with a previous interaction by the customer.

In other embodiments, a fewer or greater number of fields may be provided as the privacy parameters. A minimum of one field is required (the privacy invoked field). In such a case, the single privacy parameter field may effectively be a privacy event. If a size field is used, the size field may comprise the number of pixels to be displayed, a scaling factor (for example a percentage) of a conventional size, or any other convenient metric for indicating a desired size. If an orientation field is used, then any convenient system may be used to indicate the general orientation of the customer's hand when making the privacy gesture.

In other embodiments, a fewer or greater number of fields may be provided as the control parameters.

In other embodiments, the privacy component 54 may be integrated into the financial (or other) application.

In other embodiments, different privacy gestures may be used.

In other embodiments, a private interaction window may be closed by the customer placing his/her hand palm downwards on the translucent surface 14. This would be indicated by an inactive setting in the privacy field 102 indicating that a privacy request is now cancelled.

In other embodiments, visual indicators such as barcodes, may be provided on the customer portable device (such as the mobile phone).

In other embodiments, instead of using a predetermined number of fixed orientations, an orientation may be ascertained based on a difference between the currently measured angle of the customer's hand and the last measured angle of the customer's hand. Acceptability of the customer's hand orientation may be based on whether the angular distance is less than an angular difference parameter (for example thirty degrees). The angular difference parameter becomes a variable that can be set to a different value by different applications depending on any specific requirements.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components

What is claimed is:

1. A method of operating a computing device including a multi-touch surface, the method comprising:
   detecting a customer's first one-handed gesture indicative of a privacy request, the first one-handed gesture including placing the palm side of one hand downwards on the multi-touch surface and then pivoting the one hand upwards from the palm side downwards position on the multi-touch surface to a palm edge downwards position on the multi-touch surface;
   in response to the customer's first one-handed gesture indicative of a privacy request, displaying a private interaction window located adjacent to, and on the palm side of the one hand, the window being dimensioned to be shielded by the one hand;
   communicating private data on the private interaction window while the window is being shielded by the one hand to allow the customer to interact with the private data on the private interaction window in privacy; and
   detecting a customer's second one-handed gesture to cancel the privacy request, the second one-handed gesture including returning the palm of the one hand to the palm side downwards position on the multi-touch surface.

2. The method of claim 1, further comprising:
   detecting dimensions of the one hand based upon the degree of curl of the fingers of the one hand as the one hand is being pivoted upwards from the palm side downwards position on the multi-touch surface to the palm edge downwards position on the multi-touch surface.

3. A method of operating a computing device including a multi-touch surface, the method comprising:
   detecting a customer's first one-handed gesture indicative of a privacy request, the first one-handed gesture including placing the palm side of one hand downwards on the multi-touch surface and then pivoting the one hand upwards from the palm side downwards position on the multi-touch surface to a palm edge downwards position on the multi-touch surface;
   in response to the customer's first one-handed gesture indicative of a privacy request, displaying a private interaction window located adjacent to, and on the palm side of the one hand, the window being dimensioned to be shielded by the one hand;
   communicating private data on the private interaction window while the window is being shielded by the one hand to allow the customer to interact with the private data on the private interaction window in privacy;
   detecting a customer's second one-handed gesture to cancel the privacy request, the second one-handed gesture including returning the palm of the one hand to the palm side downwards position on the multi-touch surface; and detecting dimensions of the one hand based upon the degree of curl of the fingers of the one hand as the one hand is being pivoted upwards from the palm side downwards position on the multi-touch surface to the palm edge downwards position on the multi-touch surface changing size of the private interaction window based upon detected dimensions of the one hand.

4. A method of operating a computing device including a multi-touch surface, the method comprising:

detecting a customer's first one-handed gesture indicative of a privacy request, the first one-handed gesture including placing the palm side of one hand downwards on the multi-touch surface and then pivoting the one hand upwards from the palm side downwards position on the multi-touch surface to a palm edge downwards position on the multi-touch surface;

in response to the customer's first one-handed gesture indicative of a privacy request, displaying a private interaction window located adjacent to, and on the palm side of the one hand, the window being dimensioned to be shielded by the one hand;

communicating private data on the private interaction window while the window is being shielded by the one hand to allow the customer to interact with the private data on the private interaction window in privacy; and detecting a customer's second one-handed gesture to close the private interaction window, the second one-handed gesture including returning the palm of the one hand to the palm side downwards position on the multi-touch surface.

5. The method of claim 4, further comprising:

detecting dimensions of the one hand based upon the degree of curl of the fingers of the one hand as the one hand is being pivoted upwards from the palm side downwards position on the multi-touch surface to the palm edge downwards position on the multi-touch surface.

6. A method of operating a computing device including a multi-touch surface, the method comprising:

detecting a customer's first one-handed gesture indicative of a privacy request, the first one-handed gesture including placing the palm side of one hand downwards on the multi-touch surface and then pivoting the one hand upwards from the palm side downwards position on the multi-touch surface to a palm edge downwards position on the multi-touch surface;

in response to the customer's first one-handed gesture indicative of a privacy request, displaying a private interaction window located adjacent to, and on the palm side of the one hand, the window being dimensioned to be shielded by the one hand:

communicating private data on the private interaction window while the window is being shielded by the one hand to allow the customer to interact with the private data on the private interaction window in privacy;

detecting a customer's second one-handed gesture to close the private interaction window, the second one-handed gesture including returning the palm of the one hand to the palm side downwards position on the multi-touch surface; and detecting dimensions of the one hand based upon the degree of curl of the fingers of the one hand as the one hand is being pivoted upwards from the palm side downwards position on the multi-touch surface to the palm edge downwards position on the multi-touch surface changing size of the private interaction window based upon detected dimensions of the one hand.

\* \* \* \* \*